(12) United States Patent
Manoogian, III et al.

(10) Patent No.: US 8,751,305 B2
(45) Date of Patent: Jun. 10, 2014

(54) TARGETING USERS BASED ON PERSONA DATA

(75) Inventors: John Manoogian, III, San Francisco, CA (US); Jon Elvekrog, San Francisco, CA (US)

(73) Assignee: 140 Proof, Inc., San Francisco, CA (US)

( * ) Notice: Subject to any disclaimer, the term of this patent is extended or adjusted under 35 U.S.C. 154(b) by 376 days.

(21) Appl. No.: 13/113,905

(22) Filed: May 23, 2011

(65) Prior Publication Data

US 2011/0288939 A1 Nov. 24, 2011

Related U.S. Application Data

(60) Provisional application No. 61/347,787, filed on May 24, 2010.

(51) Int. Cl.
*G06Q 30/00* (2012.01)
*G06Q 30/02* (2012.01)

(52) U.S. Cl.
CPC ........ *G06Q 30/0251* (2013.01); *G06Q 30/0269* (2013.01); *G06Q 30/0255* (2013.01)
USPC .................... 705/14.49; 705/14.66; 705/14.53

(58) Field of Classification Search
CPC .......... G06Q 30/0251; G06Q 30/0269; G06Q 30/0255
USPC ................................. 705/14.49, 14.66, 14.53
See application file for complete search history.

(56) References Cited

U.S. PATENT DOCUMENTS

| | | | |
|---|---|---|---|
| 5,740,549 A | 4/1998 | Reilly et al. | |
| 5,754,939 A | 5/1998 | Herz et al. | |
| 5,848,396 A | 12/1998 | Gerace | |
| 6,112,186 A | 8/2000 | Bergh et al. | |
| 6,134,532 A | 10/2000 | Lazarus et al. | |
| 6,236,978 B1 | 5/2001 | Tuzhilin | |
| 6,266,649 B1 * | 7/2001 | Linden et al. | 705/7.29 |
| 6,285,987 B1 | 9/2001 | Roth et al. | |
| 6,327,574 B1 | 12/2001 | Kramer et al. | |
| 6,507,841 B2 | 1/2003 | Riverieulx De | |
| 6,804,659 B1 | 10/2004 | Graham et al. | |
| 7,065,550 B2 | 6/2006 | Raghunandan | |
| 7,194,424 B2 | 3/2007 | Greer et al. | |
| 7,212,979 B1 | 5/2007 | Matz et al | |
| 7,254,547 B1 | 8/2007 | Beck et al. | |
| 7,337,127 B1 | 2/2008 | Smith et al. | |
| 7,370,002 B2 | 5/2008 | Heckerman et al. | |
| 7,395,316 B2 | 7/2008 | Ostertag et al. | |
| 7,536,320 B2 | 5/2009 | Mcqueen, III et al. | |
| 7,593,858 B2 | 9/2009 | Matz et al. | |
| 7,685,019 B2 | 3/2010 | Collins | |
| 7,712,019 B1 | 5/2010 | Roderick | |
| 8,494,897 B1 * | 7/2013 | Dawson | 705/7.33 |
| 2002/0010757 A1 | 1/2002 | Granik et al. | |
| 2002/0194070 A1 | 12/2002 | Totham et al. | |

(Continued)

*Primary Examiner* — Scott D Gartland

(74) *Attorney, Agent, or Firm* — Jeffrey Schox; Diana Lin

(57) ABSTRACT

A method of targeted advertisement distribution based on persona data derived from a social network, wherein the social network includes a plurality of content streams, each content stream associated with a user and a user summary. The method includes the steps of receiving an advertisement request from a third party environment with associated content, identifying a content stream that includes a reference to the third party content, identifying a persona based on the user associated with the identified content stream, and serving an advertisement to the third party environment based on the identified persona.

24 Claims, 5 Drawing Sheets

(56) References Cited

U.S. PATENT DOCUMENTS

| | | |
|---|---|---|
| 2004/0059708 A1 | 3/2004 | Dean et al. |
| 2006/0020593 A1* | 1/2006 | Ramsaier et al. ............ 707/5 |
| 2006/0167747 A1 | 7/2006 | Goodman et al. |
| 2006/0242554 A1* | 10/2006 | Gerace et al. ............ 715/501.1 |
| 2007/0105536 A1 | 5/2007 | Tingo |
| 2007/0121843 A1* | 5/2007 | Atazky et al. ............ 379/114.13 |
| 2007/0162926 A1 | 7/2007 | Steelberg et al. |
| 2007/0203894 A1* | 8/2007 | Jones et al. ............ 707/3 |
| 2007/0282785 A1 | 12/2007 | Fayyad et al. |
| 2008/0040475 A1 | 2/2008 | Bosworth et al. |
| 2008/0077576 A1 | 3/2008 | Ozveren et al. |
| 2008/0097849 A1* | 4/2008 | Ramsaier et al. ............ 705/14 |
| 2008/0147482 A1 | 6/2008 | Messing et al. |
| 2008/0147487 A1* | 6/2008 | Hirshberg ............ 705/10 |
| 2008/0195466 A1 | 8/2008 | Wright |
| 2008/0209339 A1 | 8/2008 | Macadaan et al. |
| 2008/0243780 A1 | 10/2008 | Nance et al. |
| 2008/0275899 A1 | 11/2008 | Baluja et al. |
| 2009/0063229 A1 | 3/2009 | Coladonato et al. |
| 2009/0063284 A1 | 3/2009 | Turpin et al. |
| 2009/0070219 A1 | 3/2009 | D'Angelo et al. |
| 2009/0119167 A1* | 5/2009 | Kendall et al. ............ 705/14 |
| 2009/0193097 A1 | 7/2009 | Gassewitz et al. |
| 2009/0198711 A1 | 8/2009 | Datar et al. |
| 2009/0216620 A1 | 8/2009 | Lee |
| 2009/0319359 A1 | 12/2009 | Soza et al. |
| 2010/0042471 A1 | 2/2010 | Chang et al. |
| 2010/0057577 A1 | 3/2010 | Stefik et al. |
| 2010/0125502 A1* | 5/2010 | Solomon et al. ............ 705/14.52 |
| 2010/0257023 A1 | 10/2010 | Kendall et al. |
| 2011/0119133 A1* | 5/2011 | Igelman et al. ............ 705/14.58 |
| 2011/0153414 A1 | 6/2011 | Elvekrog et al. |
| 2011/0153423 A1 | 6/2011 | Elvekrog et al. |
| 2011/0153588 A1 | 6/2011 | Gartner et al. |
| 2011/0246463 A1* | 10/2011 | Carson et al. ............ 707/737 |
| 2011/0288935 A1 | 11/2011 | Elvekrog et al. |
| 2011/0288937 A1 | 11/2011 | Manoogian, III et al. |
| 2011/0288939 A1 | 11/2011 | Elvekrog et al. |
| 2012/0123866 A1 | 5/2012 | Li et al. |
| 2013/0304691 A1* | 11/2013 | Pinckney et al. ............ 706/52 |

* cited by examiner

TARGETING USERS BASED ON PERSONA DATA

CROSS-REFERENCE TO RELATED APPLICATIONS

This application claims the benefit of U.S. Provisional Application No. 61/347,787 filed 24 May 2010, which is incorporated in its entirety by this reference.

TECHNICAL FIELD

This invention relates generally to the social network field, and more specifically to a new and useful method and system for targeting users based on persona data in the social network field.

BACKGROUND

Social networks have become an integral part of the internet ecosystem in recent years. The social web has more recently begun to branch out of social network domains and has begun integrating with other websites. For example, commenting and discussions on many websites can now be carried out using social network identities. However, much of the rich information that a user customizes within a social network (e.g., through establishing connections with friends and entities) is lost when accessing a third party site. Thus, there is a need in the social network field to create a new and useful method and system for targeting users based on persona data. This invention provides such a new and useful method and system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Targeting Users Based on Persona Data

Figure 1:
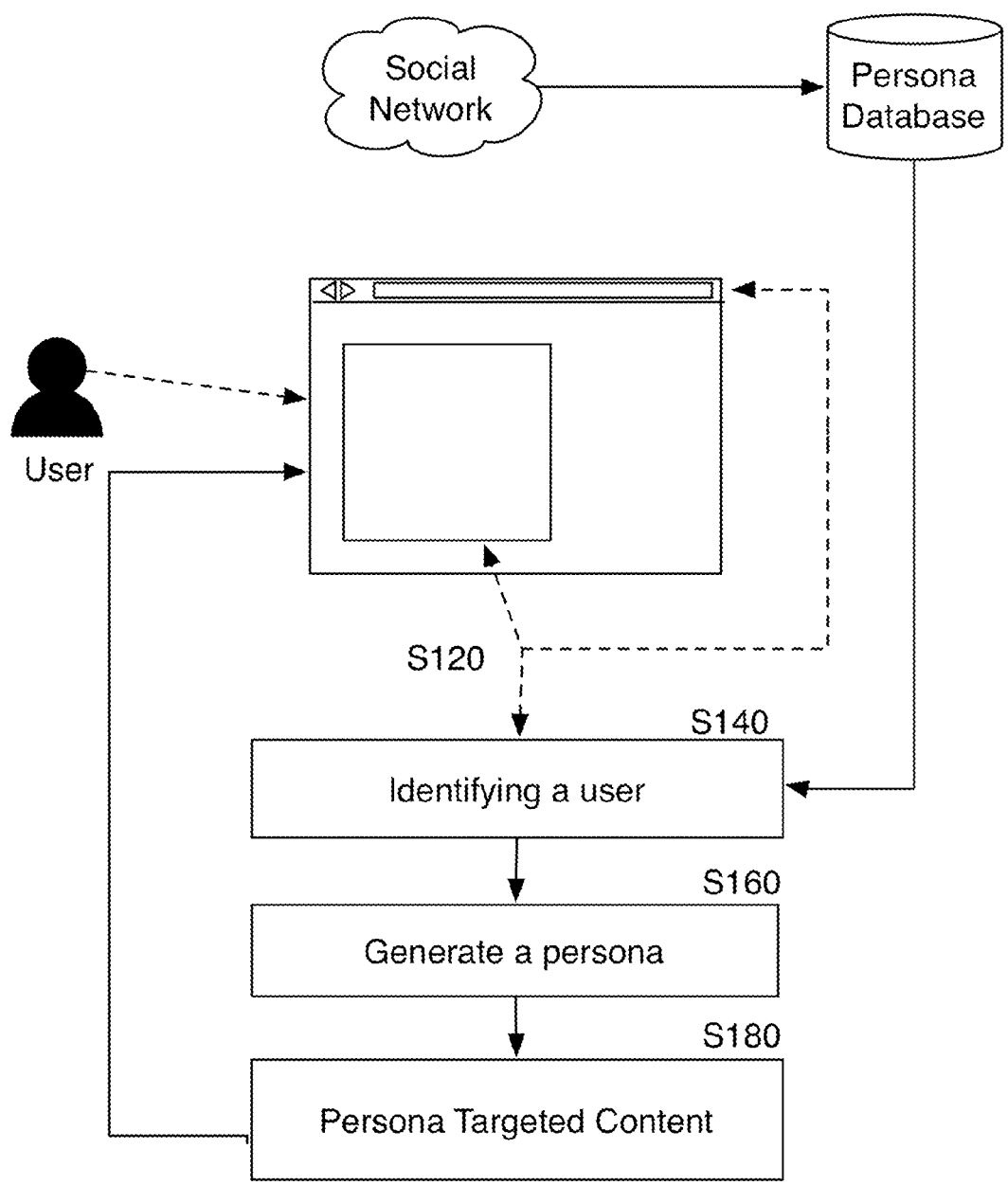
FIG. 1 is a schematic representation of a method of a preferred embodiment of the invention.

As shown in FIG. 1, a method for targeting users based on persona data of a preferred embodiment includes detecting a social network entity associated with a third party environment S120, identifying a user summary for the social network entity S140, generating a persona from the identified user summary S160, and serving persona targeted content to the third party environment S180. The method functions to use the vast amount of personal information available on social networking sites for generating content relevant to users of third party websites or applications. The system further functions to use a persona abstraction layer which functions to generalize a user for more general targeting of content. The persona abstraction may additionally be used to prevent third parties from having direct access to private data and/or highly detailed information available on a social network such as Facebook or Google Buzz. The method is preferably used for serving persona targeted advertisements, and is preferably performed in response to the receipt of an advertisement request from the third party environment. However, the method may alternatively be used for customizing the content for a user, such as by promoting articles more relevant to a user. The third party environment is preferably a third party website (e.g. with a different domain than the social network), but may alternatively be an internet connected application such as a mobile or desktop application. The method may be used for delivering content that is highly specialized for the user viewing the outside website, but may alternatively utilize information from the content of the webpage and/or the social network to make assumptions of the characteristics of the user viewing the outside website.

This method is preferably utilized with a persona database, which is preferably a programmatic abstraction of user interests and traits associated with an entity of the social network. A persona database is preferably created to store user-persona information, but may alternatively be dynamically created. A persona is preferably generated for a plurality of users, and more preferably for a substantial portion of a social network, but may alternately be generated for a single user. The personas are preferably generated from a plurality of user summaries, wherein the user summaries are preferably generated from the content of a social network, such as user-associated user profiles, content streams, social connections, social network behavior, and/or any suitable aspect of a social network. The persona data may alternatively be generated or cooperatively used by another system for any suitable purpose. For example, an advertising system for the social network may generate a persona database containing user summaries for a plurality of users. The forming of a user summary is preferably composed of at least one of the sub-steps: extracting keywords from a user profile, extracting keywords from referenced sources (such as links, media files or embedded applications), extracting keywords from the content stream (e.g. both user generated and from subscribed feeds), analyzing social network connections, analyzing location information, determining social network tools of the user, and/or any suitable technique. In creating a user summary, the above sub-steps and any suitable alternative steps may be used in any suitable combination. A user summary is preferably composed of a plurality of vector parameters (e.g. attributes) that cooperatively define characteristics of a user. Vectors are preferably different metrics of specifying aspects of user characteristics. Preferably, the vectors include keywords, location, influence (i.e., number of followers or friends), mentions (i.e., the number of times the person is discussed by others), demographic, and/or any suitable descriptor of a persona. A vector parameter is preferably the variable value for a particular vector. For example, a location vector may have a parameter of 'San Francisco' and a keyword vector may have a parameter of 'baseball'. Keywords may additionally be weighted based on strength of an association with a user. The weighting of keywords is preferably applied to keywords based on the amount of presence the keywords have in the user profile. This is preferably based on frequency of the keyword, predefined weighting factors for terms, statistical improbability (similar to the statistically improbable phrases used by the Amazon search engine), or any suitable metrics of the importance of a keyword when describing a user. Additionally, the user summary is updated periodically.

Future analysis of a user preferably enhances the user summary by adding keyword data, but may alternatively entirely refresh the user summary, effectively creating a new user summary from the most recent information. Depending on the implementation of the method, a persona may alternatively be generated on-demand such as during Step S160, generating a persona from the identified user summary. For example, the system may use one of two separate methods for building a user profile; one that can be executed with no prior knowledge of the user and therefore responds rapidly, and one that performs an analysis over a much larger data set and tracks changes over time, and therefore operates in batch mode.

Step S120, which includes detecting an association between a social network entity and a third party environment, functions to identify an association between an outside webpage, content, or application and at least one entity of a social network. An entity of the social network is preferably a user, but may alternatively be a company, a channel (that users can preferably subscribe to), or any suitable element of a social network. Step S120 preferably includes performing at least one of the following sub-steps: detecting a user accessing the third party environment S122, and detecting a reference to the third party content within the social network S123, which includes detecting an implicit reference to the third party content S124 and/or detecting an explicit reference to the third party content S126. The detection of a social network entity may alternatively be performed in any suitable manner. The detection of a social network entity is preferably performed by a script executed outside the third party environment, but may alternately be performed by a script executed within the third party environment. The script may alternatively be an implementation of an application programming interface (API) of the social network, a javascript routine, a server side executable routine such as a CRON job, and/or any suitable programmatic executable routine.

Figure 2A:
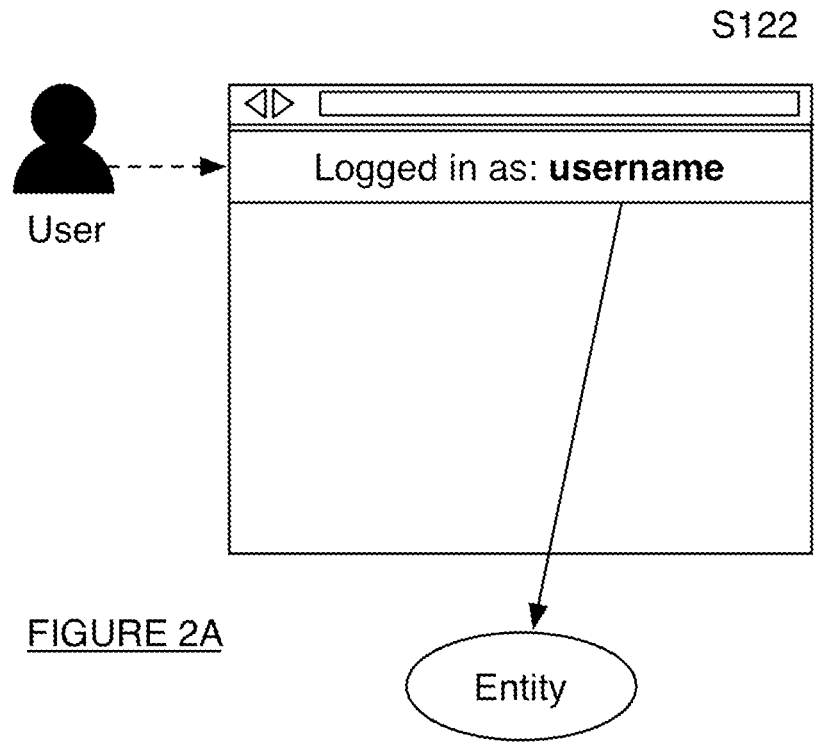
FIGS. 2A and 2B are exemplary representations of detecting a user accessing a third party environment.
Figure 2B:
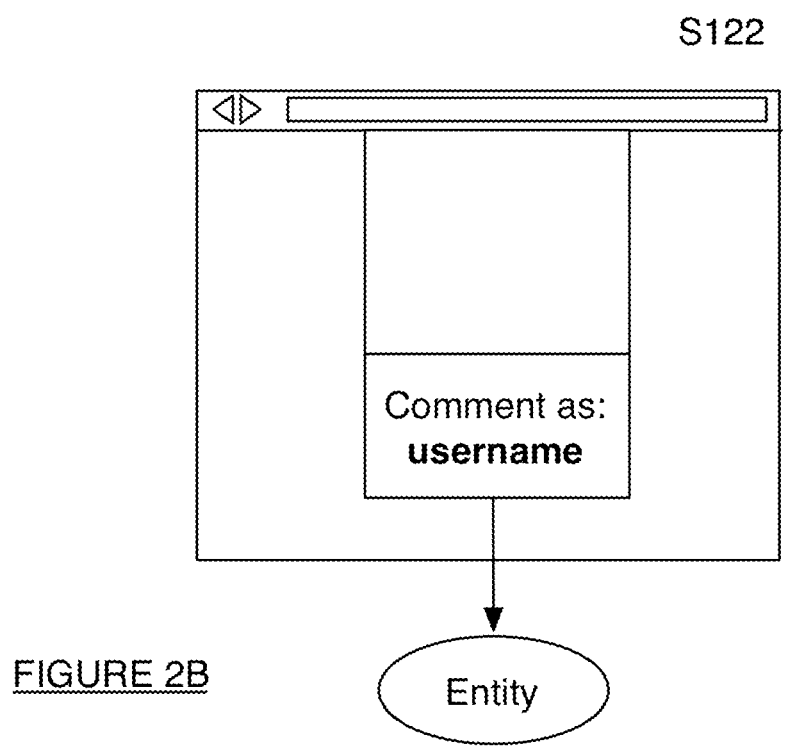

Step S122, which includes detecting a user accessing the third party environment, functions to use existing identification technology of a social network. A user may be detected accessing an third party environment in a number of ways. When a user visits a website by following a link from the social website the username may be embedded in the URI. As shown in FIG. 2A, a website may alternatively utilize any suitable identification system that allows users of a social network to log in to the third party website or application using the social network information such as Facebook Connect. Additionally a website or application may automatically detect a social network user. Additionally, many websites enable commenting and discussion to be conducted using a social network identity. The use of a social network identity for commenting is preferably detected and the associated identity recorded as shown in FIG. 2B.

Figure 3:
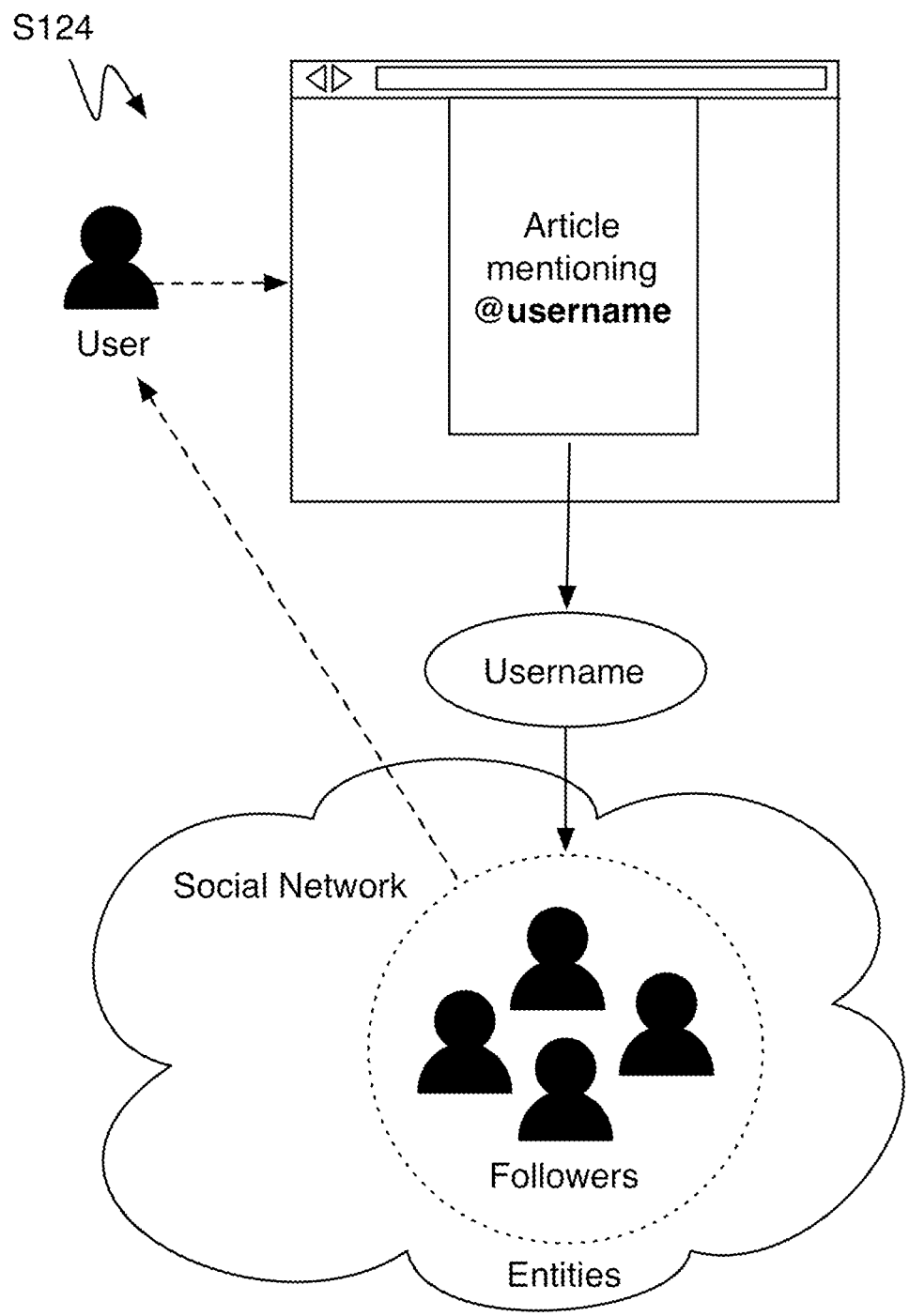
FIG. 3 is a schematic representation of an embodiment of detecting implicit references to the content of a third party environment.

Step S124, which includes detecting an implicit reference to the third party content, functions to recognize content streams and users that are indirectly associated with the third party content. This is preferably accomplished by performing the sub steps of detecting keyword mentions, more preferably high-interest keyword mentions, within the body of the third party content, and detecting entities associated with the detected keyword. Detected keywords are preferably usernames, but may alternately be a real name, a meme, or any other suitable keyword. A shown in FIG. 3, a preferred method of recognizing keywords is by conforming to a convention of detecting the at-symbol, "@", as a call out to a social network user reference. For example, the inclusion of the text "@username" would indicate a reference to the social network user "username". Alternately, hash tags ("#"), alpha-numeric tagging, any other suitable convention, or no convention may alternatively be searched to find a high-interest keyword. Such references are preferably analyzed and identified by an embedded javascript that checks the content of a webpage or application for such references. However, these references may also be determined by scraping the content, analyzing images or video associated with the content, or any other suitable content analysis method. In addition to keywords, people, businesses, or other entity names may be detected and then an associated user is searched for inside a social network. This may be particularly useful for detecting companies or names contained in headlines, by-lines, or authorship fields within articles.

Detected entities are preferably those that have shown interest in content related to the third party content, as indicated by the user's profile, content stream feeds, and posts. More preferably, identified users are followers of a keyword, wherein a portion of the user's associated content stream is preferably generated from the keyword. Examples of identified users include followers of a username, entities who tag keywords (e.g. by using a "#," or a tag) within their posts, keyword-generated feed recipients, or any other user that receives or generates content around a keyword.

Figure 4:
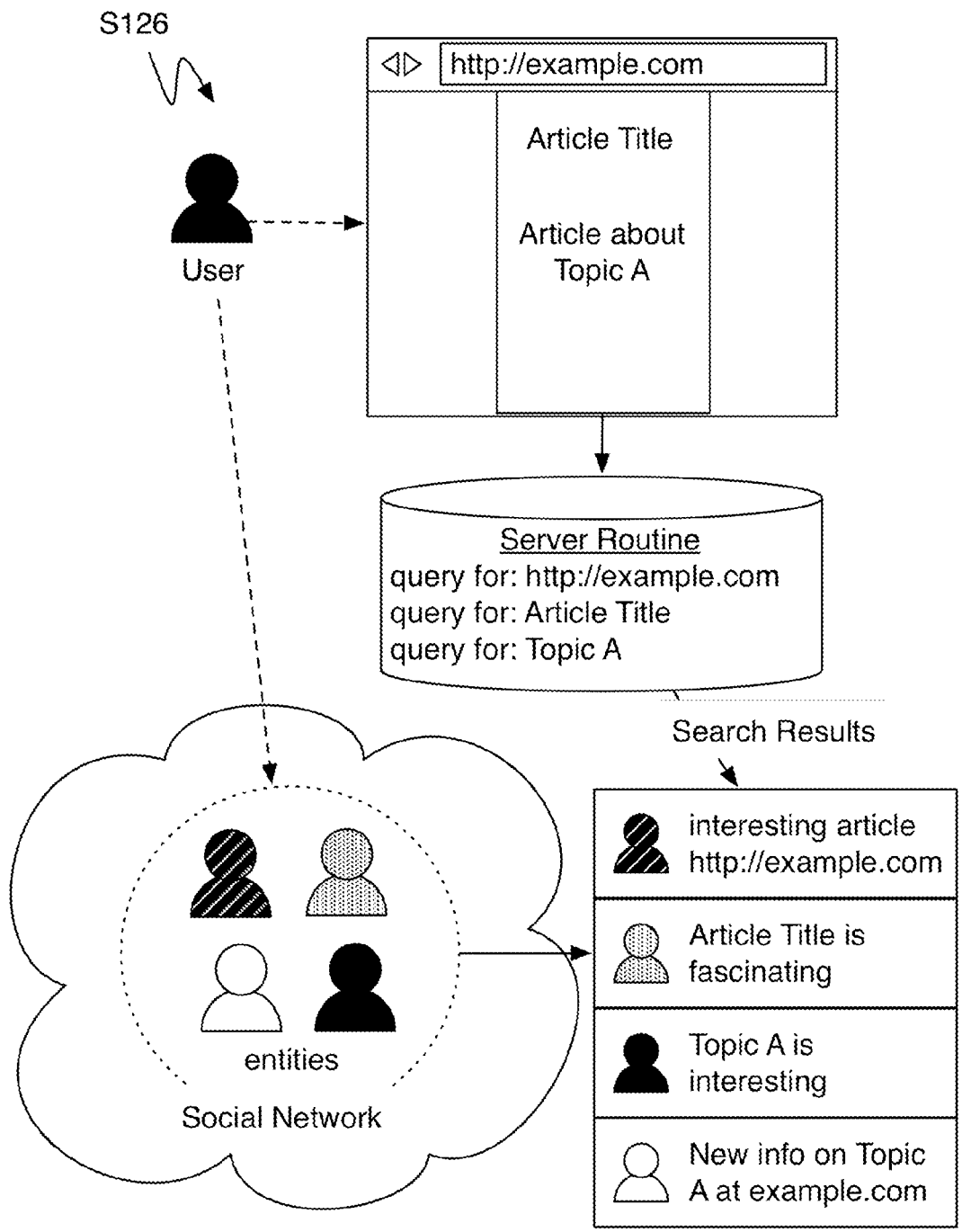
FIG. 4 is a schematic representation of an embodiment of detecting explicit references to the content of a third party environment.

Step S126, detecting an explicit reference to the third party content, functions to actively query a social network to identify direct references to the third party environment. As shown in FIG. 4, a content stream of a social network is preferably queried for recent or existing posts linking or directly referring to the third party content. A preferred form of querying for references is by searching for a universal resource identifier (URI) linking to the third party environment, preferably a webpage. The URI may be a link to the exact webpage a user is currently viewing, page of a website, or shortened version of the URI, or any suitable reference related to the webpage. The search may be implemented using a search engine provided by the social network, but may alternatively use outside sources providing search capabilities of a social network. Alternately, other references may be queried, such as a title of the third party content or an author's name. The users (i.e. entities) that posted the content are preferably identified. A server or any suitable device preferably runs such searches periodically. The search may alternatively be conducted at the time a user accesses the webpage or third party environment.

Step S140, which includes identifying a user summary for the social network entity, functions to retrieve user-related information associated with the detected social network entity or entities. In one variation, user summaries are preferably generated for each social network entity in the same manner as described above. In the situation where Step S122 detects the entity of the user presumably accessing the third party environment, the user summary of that entity is preferably used without modification. This functions to have a highly individualized characterization of the current user. In other situations, the method preferably creates abstractions of an assumed user of the third party environment. In the situation where Step S123 detects a reference to the third party content, the user summaries associated with the identifies entities are preferably used in Step 160 to generate a persona. Using the identified user summaries to generate the persona functions to assume that the third party environment user is better characterized by their peers (i.e. the identified users), than by the third party content.

Step 160, which includes generating a persona based on the user summary of the social network entity, functions to generalize a user for more general targeting of content, and may additionally function to prevent third parties from having direct access to private data and/or highly detailed information available on a social network. In many cases, a plurality of entities may be identified. In situations where the third party environment user is unknown, such as detecting a plurality of followers of a keyword in Step S124 or detecting a plurality of entities creating content in Step S126, the associated user summaries of the plurality of entities are preferably analyzed to identify at least one persona. The user summaries associated with the plurality of entities may be averaged, abstracted to find a statistically significant high-level abstraction of the entities, additively merged, or otherwise combined to form a new persona for a virtual follower of the entity. In one embodiment, similar vector parameters between the detected user summaries are identified and used to form the virtual persona. In a second embodiment, vector parameters of the detected user summaries are abstracted to a predefined level (e.g. a predefined rank, wherein the vector parameters are abstracted based on a relationship hierarchy) before similarities are found between the user summaries and a persona generated from the similarities. Alternately, a predetermined persona may be used, particularly when the users of a certain population (e.g. followers of a keyword) are well characterized.

Step S180, which includes serving persona targeted content to the third party environment, functions to utilize the generated persona information to target the content delivered to third party environment and/or to personalize the experience of the third party environment. In one preferred embodiment, the delivering of persona targeted content preferably includes serving advertisements that correspond to the identified persona(s). Each advertisement preferably has an associated advertisement summary, comprising a list of keywords, attributes, or vector parameters that describe an audience targeted by the advertiser. The advertisement served is preferably selected based on the generated persona, more preferably based on how well the advertisement matches the persona. However, the advertisement may be selected in any suitable manner (e.g. based on advertisement priority). The advertisement is preferably matched to the persona based on a similarity score calculated between an advertisement summary and the persona, wherein the advertisement with the highest similarity score is selected. Alternately, an advertisement with a similarity score above a predetermined threshold may be deemed a match with the persona. In a second embodiment, the persona information is passed to the third party environment in a raw format or any suitable summary form, and the third party environment preferably customizes content in any suitable manner.

2. System for Targeting Users Based on Persona Data

Figure 5:
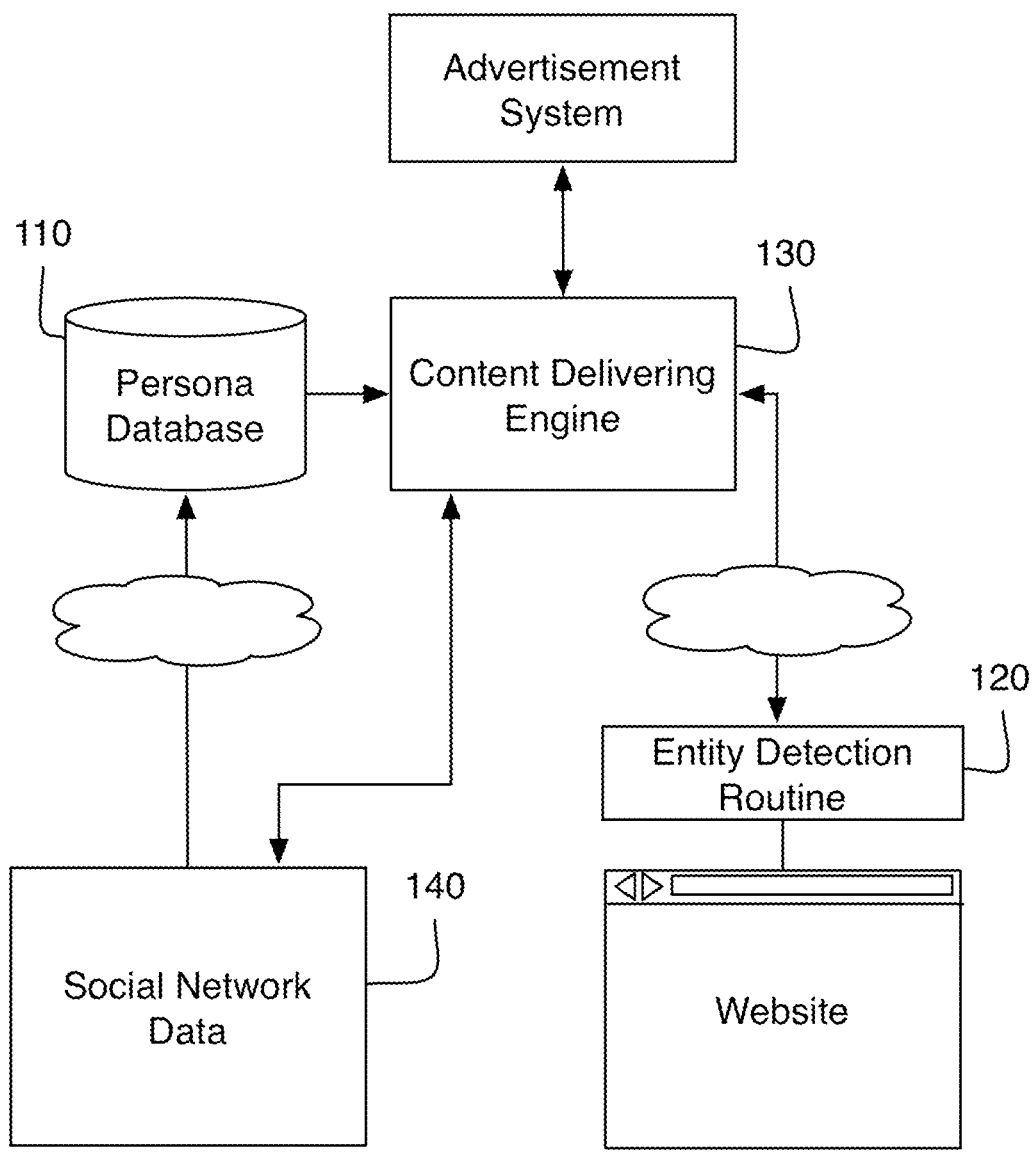
FIG. 5 is a schematic representation of a system of a preferred embodiment of the invention.

As shown in FIG. 5, a system for targeting users based on persona data of a preferred embodiment includes a persona database 110, an entity detection routine 120, and a content delivering engine 130. The system functions to allow third party websites and applications to utilize rich data available in a social network for delivering relevant content to users of the website or application. The system further functions to use a persona abstraction layer which functions to generalize a user for more general targeting of content. The persona abstraction may additionally be used to prevent third parties from having direct access to private data and/or highly detailed information available on a social network such as Facebook or Google Buzz.

The persona database 110 functions as a repository of user characterization information. The persona database 110 preferably includes a user summary for each of a plurality of users. The persona database 110 may be actively updated database of a substantial number of users of a social network ecosystem or users of interest. Alternatively, the persona database 110 may be a sampling of users for estimating the audience. A user summary is preferably generated from a social network content stream of a user. A variety of aspects of a user account on a social network content stream are preferably analyzed to generate a user summary, including a user profile, posted content, metadata of posted content such as location, followed users, following users, and any suitable aspect of the user account. The user summary is preferably defined with various vector parameters. The vectors are preferably various metrics used to define the characteristics of a user. Preferably, the vectors include keywords, location, influence (i.e., number of followers or friends), mentions (i.e., the number of times the person is discussed by others), demographic, and/or any suitable descriptor of a persona. A vector parameter is preferably the variable value for a particular vector. The user summary may alternatively have any suitable structure. Furthermore, the persona database 110 may additionally store one or more personas. A persona preferably describes a group of users with related vectors or vector parameters, but may alternately describe a single user. The persona preferably has a structure similar to the user summary, and is preferably created by abstracting, averaging, or finding similarities between the users of the described group. A persona engine preferably generates the persona database 110 by processing social network data. The persona database 110 may alternatively be created, shared, or maintained by another system such as an advertisement system. In an alternative embodiment a persona of a user is preferably generated in real-time, and a database of a plurality of personas may not be maintained.

The entity detection routine 120 functions to detect an entity of a social network associated with a third party environment. The third party environment is preferably a website or application or device that wants to benefit from persona targeted content. A social network may additionally use the persona targeted content, or alternatively use the persona information of a second social network. The entity detection routine 120 is preferably separate from the third party environment, but may alternately be integrated. The entity detection routine 120 is preferably a javascript routine that can be included within a webpage that runs when a user views the third party environment. The entity detection routine 120 may alternatively be an API for applications or websites, a server routine, or any suitable program routine in communication with the third party environment. The entity detection routine 120 preferably detects social network entities that have an association with the third party environment. In one variation, the entity detection routine 120 preferably extracts the entity of a user using a social network identification system. In another variation, the entity detection routine 120 preferably detects mentions or references to a high-interest keyword within the content of the third party environment, such as a username that multiple entities are following, a real name that multiple entities are interested in, or a meme that multiple entities have been contributing to. In this variation, the entity detection routine 120 may additionally detect the entities that are interested in the keyword. In another variation, an entity or plurality of entities are preferably detected by querying the social network, more preferably the content streams of the network, for references to the website, application, related company, keywords and/or any suitable aspect associated with the third party environment.

The content delivering engine 130 functions to process the detected entity to identify an appropriate persona to use for content selection. The content delivering engine 130 is preferably in communication with the persona database 110 and the entity detection routine 120. The content delivering engine 130 preferably identifies the persona(s) associated with the entities detected with the entity detection routine 120. The content delivering engine 130 may also generate a persona from the user summaries of the identified entities. The content delivering engine 130 may additionally compile content for the third party environment. In a preferred embodiment, the compiled content is preferably advertisements that are preferably selected based on identified persona, wherein the content delivering machine selects the advertisements. The advertisements are preferably selected based on a similarity score calculated between the advertisement and the persona, wherein the advertisement is selected if the score is above a predetermined threshold. Alternatively, content may be compiled by the third party environment or any suitable party.

The system may additionally include social network data 140 that functions as a source of querying or understanding connections and behavior of users of a social network. The social network data 140 is preferably established through communication through a social network API but may alternatively be a repository of data or any suitable form of data. The social network data 140 preferably pertains to all or a significant portion of users of the social network. The data 140 may alternatively be a model of a social network. The social network connection data 120 is preferably obtained directly from the social network. The social network connection data 120 may alternatively be scraped in real-time or obtained from a cached or third party service. The social network connection data 120 is preferably used in combination with the persona database no to analyze connections of persona groups.

An alternative embodiment preferably implements the above method in a computer-readable medium storing computer-readable instructions. The instructions are preferably executed by computer-executable components integrated with a social network and an outside environment. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method of targeted advertisement distribution based on persona data derived from a social network, the social network including a plurality of content streams, each associated with a user summary, the method comprising the steps of:
    at a server, receiving an advertisement request from a third party environment with associated content in response to third art environment access by an unknown user, the third party environment having a different domain than the social network;
    at the server, detecting a first explicit reference to the third party content in a first content stream generated by a first user and a second explicit reference to the third party content in a second content stream generated by a second user;
    at the server, generating a persona based on the first and second user summaries associated with the first and second content streams, respectively;
    at the server, selecting an advertisement from a plurality of advertisements for the unknown user by determining the similarity between the advertisement and the generated persona; and
    at the server, serving the selected advertisement to the third party environment for the unknown user.

2. The method of claim 1, wherein the first and second explicit references are of the same reference type.

3. The method of claim 2, wherein the reference type is a universal resource identifier linking to the third party content.

4. The method of claim 1, wherein generating a persona based on the first and second user summaries includes the steps of:
    abstracting the attributes of the first and second user summaries;
    determining the similarities between the abstracted attributes of the first and second user summaries; and
    creating a persona from the determined similarities.

5. The method of claim 1, wherein the advertisement includes an advertisement summary comprising a plurality of attributes, determining the similarity between the advertisement and the generated persona comprises calculating a similarity score between the advertisement summary and the persona, and selecting an advertisement comprises selecting the advertisement when the similarity score is above a predetermined threshold.

6. A method of targeted advertisement distribution based on persona data derived from a social network, the social network including a plurality of content streams, each associated with a user and a user summary, the method comprising the steps of:
    at a server, receiving an advertisement request from a third party environment for an unknown user, the third party environment hosting an article and having a different domain than the social network;
    at a server, detecting a keyword mention in the article;
    at a server, detecting the keyword in a first and a second content stream generated by a first and second user, respectively;
    at a server, generating a persona based on the first and second user summaries associated with the first and second content streams, respectively;
    at a server, selecting an advertisement from a plurality of advertisements by determining the similarity between the advertisement and the generated persona; and
    at a server, serving the selected advertisement to the third party environment for the unknown user.

7. The method of claim 6, wherein the keyword is a username.

8. The method of claim 6, wherein the keyword mention in the third party content is detected by detecting an alphanumeric tag.

9. The method of claim 6, wherein the first content stream includes feeds generated from the keyword.

10. The method of claim 6, wherein the second content stream includes content generated by the associated user, the generated content comprising the keyword.

11. The method of claim 6, wherein the step of detecting a keyword mention in the article includes detecting a keyword tagging convention.

12. A method of targeted advertisement distribution based on persona data derived from a social network, the social network including a plurality of content streams, each associated with a user and a user summary, the method comprising the steps of:
    at a server, receiving an advertisement request from a third party environment for an unknown user, the third party environment having third party content and a different domain than the social network;

at a server, identifying a content stream generated by a user from the plurality of content streams that includes a reference to the third party content;

at a server, identifying a persona based on the user associated with the identified content stream; and at a server, serving an advertisement to the third party environment for the unknown user based on the identified persona.

13. The method of claim 12, wherein the third party content is a webpage instance.

14. The method of claim 12, wherein the reference is implicit and includes feeds generated from a keyword.

15. The method of claim 14, wherein the keyword is a username.

16. The method of claim 12, wherein the reference is an explicit reference to the third party content.

17. The method of claim 16, wherein the reference is a link to the third party content.

18. The method of claim 12, wherein the step of identifying a content stream identifies a plurality of content streams including the reference and the step of identifying a persona comprises generating a persona from the plurality of user summaries associated with the plurality of identified content streams.

19. The method of claim 18, wherein the step of generating a persona from the plurality of users includes extracting common attributes from the plurality of user summaries, the persona comprising the common attributes.

20. The method of claim 19, wherein the step of generating a persona from the plurality of users includes abstracting the attributes within each user summary before common attributes are extracted.

21. The method of claim 12, wherein the step of identifying a persona comprises identifying a predefined persona associated with the user with the identified content stream.

22. The method of claim 12, wherein the advertisement includes an associated advertisement summary comprising a list of keywords, the identified persona comprises a list of keywords, and the step of serving an advertisement comprises selecting an advertisement based on the similarity between the associated advertisement summary and the persona.

23. The method of claim 22, wherein the advertisement is selected by calculating a similarity score between the advertisement summary and the persona, and selecting an advertisement comprises selecting the advertisement when the similarity score is above a predetermined threshold.

24. The method of claim 12, wherein the step of identifying a content stream identifies a first content stream with an implicit reference to the third party content and a second content stream with an explicit reference to the third party content, and the step of identifying a persona comprises identifying the persona based on the first and second users associated with the first and second content streams, respectively.

* * * * *